United States Patent [19]

Hönl

[11] 4,422,594
[45] Dec. 27, 1983

[54] AUTOMATIC ROLL-UP DEVICE FOR A SAFETY BELT

[75] Inventor: Wolf-Dieter Hönl, Schwäbisch Gmünd, Fed. Rep. of Germany

[73] Assignee: Repa Feinstanzwerk GmbH, Alfdorf, Fed. Rep. of Germany

[21] Appl. No.: 320,870

[22] Filed: Nov. 13, 1981

[30] Foreign Application Priority Data

Nov. 14, 1980 [DE] Fed. Rep. of Germany ....... 3043014

[51] Int. Cl.³ ...................... A62B 35/02; B65H 75/48
[52] U.S. Cl. ..................... 242/107.4 A; 242/107.4 B; 280/806; 297/478
[58] Field of Search ................. 242/107.4 A, 107.4 B; 280/806; 297/478

[56] References Cited

U.S. PATENT DOCUMENTS

| 3,819,126 | 5/1974 | Stoffel | 242/107.4 A |
| 3,991,953 | 11/1976 | Takada et al. | 242/107.4 A |
| 4,148,446 | 4/1979 | Sugar | 242/107.4 A |
| 4,190,213 | 2/1980 | Ueda | 242/107.4 B X |
| 4,300,733 | 11/1981 | Morinaga | 242/107.4 A |

*Primary Examiner*—Stuart S. Levy
*Assistant Examiner*—Lloyd D. Doigan
*Attorney, Agent, or Firm*—Herbert L. Lerner; Laurence A. Greenberg

[57] ABSTRACT

Automatic roll-up device for a safety belt in vehicles, with means for blocking the belt roller in the case of danger, consisting of a detent locking mechanism which is automatically operated by a vehicle-sensitive and/or belt-sensitive activating mechanism. A locking detent is provided which can lock with locking teeth of locking wheels fixed to the belt shaft. A control part which is freely rotatably supported on the belt shaft serves to operate the locking detent. The control part can be moved to its locking position by a support member, which is fixed to the belt shaft and has locking teeth, by the action of a sensor pawl lever which is supported at the control part and can be directly positioned by means of a vehicle-sensitive inertia sensor. And/or a belt-sensitive inertia sensor which is attached to the support member can lock-in with the control part.

9 Claims, 5 Drawing Figures

FIG. 2
FIG. 3
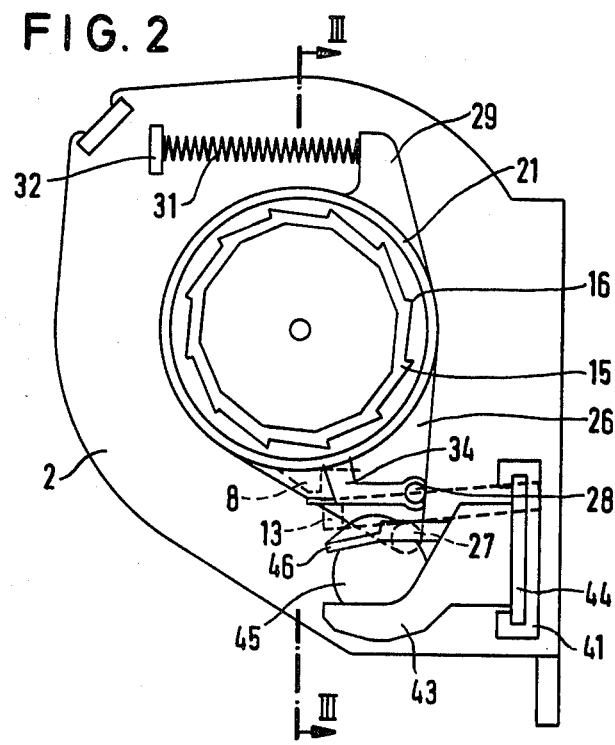
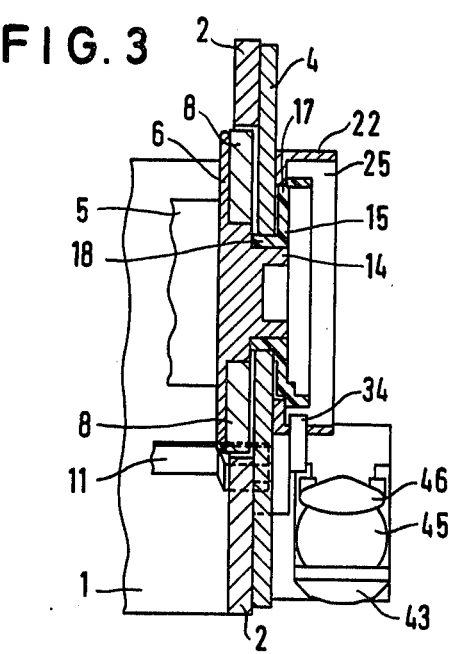

AUTOMATIC ROLL-UP DEVICE FOR A SAFETY BELT

BACKGROUND OF THE INVENTION

1. Field of the Invention

The invention relates to an automatic roll-up device for a safety belt in vehicles, having means for blocking the belt roller in case of danger, consisting of a detent locking mechanism which is automatically operated by a vehicle-sensitive and/or belt-sensitive activating mechanism.

2. Description of the Prior Art

Known automatic roll-up devices for safety belts have a roll-up spring arranged at one side of the belt shaft, while the shaft end at the opposite side operates as a detent or locking device in conjuction with an activating mechanism which is vehicle-sensitive, i.e. responds to the vehicle. The vehicle-sensitive locking process is initiated by triggering the vehicle-sensitive activating mechanism, for example, in the form of a ball-mass which can move when either a strong deceleration or acceleration of the vehicle occurs. With the displacement of the ball a pawl is engaged with a coupling disc which is rotatably mounted on the belt shaft, and which displaces with a coupling means a control pawl which is hingeably supported on the belt shaft, and for example, moves it radially toward the outside. Whereby the control pawl is functionally arranged sequentially after the action of the coupling disc. The control pawl interacts with a control lever which moves a locking detent in such manner that the locking detent locks with locking teeth rigidly attached to the housing of the automatic belt lock, and the locking process is thereby completed. The coupling disc serves as a belt-sensitive activating mechanism, such that if the belt is suddenly pulled out, i.e. in the case of a crash, the coupling disc with its control means moves in relation to the pawl-lock mechanism, together with operation of the above mentioned control pawl, causing engagement of the control lever, and finally the motion of the locking detent into the lock-position. In the constructions of this type, function-wise the means for the vehicle-sensitive locking and for the belt-sensitive locking are arranged in series one after the other. In each case, when the vehicle-sensitive activating mechanism is used, the transfer of the locking motion is effected through the parts which belong to the belt-sensitive mechanism.

SUMMARY OF THE INVENTION

An object of the invention is to provide an automatic roll-up device with means for blocking the belt roller in case of danger, consisting of a detent locking mechanism which is automatically operated by a vehicle-sensitive and/or belt-senesitive actuating mechansim in such manner, that a mutual functional dependence of the vehicle-sensitive and the belt-sensitive activating mechanism is eliminated. A simple, spatially separated construction form permit a direct effect of the activating mechanisms on the detent locking arrangement, which effect takes place in an extremely short time interval.

With the foregoing and other objects in view, there is provided in accordance with the invention, an automatic wind-up roller for a safety belt of a vehicle with means to block a belt shaft on which the safety belt is wound in case of danger due to exceeding a predetermined acceleration or deceleration of the vehicle or due to exceeding a predetermined acceleration of belt pullout, comprising a housing, a belt shaft rotatably supported in the housing, a safety belt rolled around the belt shaft, a locking wheel with locking teeth fixed to the belt shaft and rotatable therewith, a locking detent adapted to engage the locking teeth of the locking wheel to block the belt shaft in case of danger but normally out of engagement with the locking teeth, a control part rotatably supported on the belt shaft rotatable from a rest position to a locking position in which the control part moves the locking detent in engagement with the locking teeth of the locking wheel, a support member fixed to the belt shaft for moving the control part to its locking position, said support member having locking teeth and a sensor pawl lever mounted on the control part and movable to engage the locking teeth of the support member, (a) a vehicle-sensitive inertia sensor which activates said sensor pawl lever to move to engage the locking teeth of the support member when a predetermined acceleration or deceleration of the vehicle is exceeded, and (b) a belt-sensitive inertia sensor attached to said support member which sensor engages the control part to move to its locking position when the belt pullout exceeds a predetermined acceleration.

Other features which are considered as characteristiv fo the invention are set forth in the appended claims.

Although the invention is illustrated and described herein as embodied in an automatic roll-up device for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIGS. 2 and 3 are a side view and a sectional view of the automatic roll-up device according to FIG. 1 for locking responsive to the vehicle, in which the parts required for belt-sensitive locking are omitted.

DETAILED DESCRIPTION OF THE INVENTION

Figure 1:
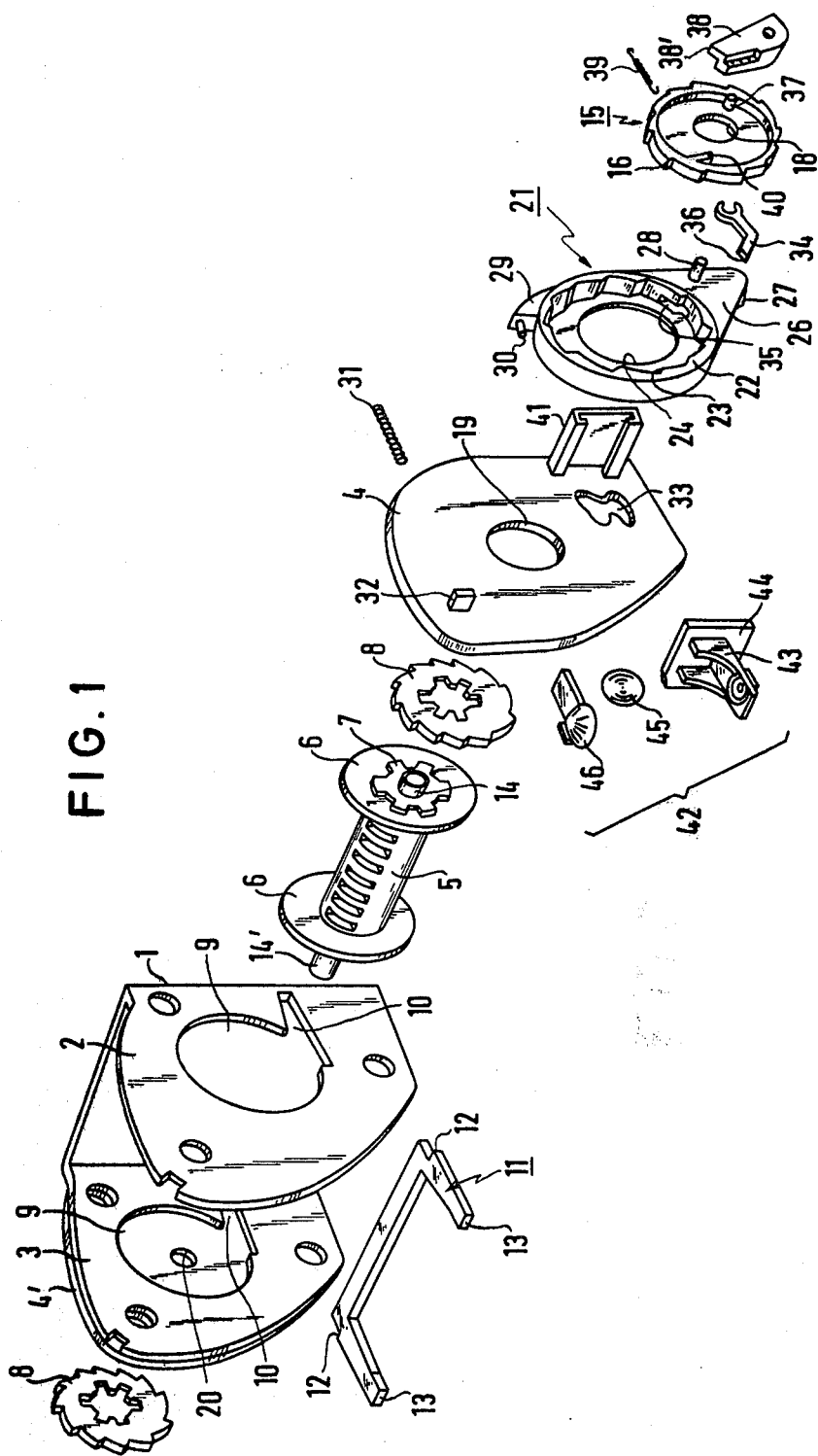
FIG. 1 is an exploded view of the automatic roll-up device according to the invention, with all parts required for the locking means, sensitive to acceleration or decelartion of the vehicle, as well as acceleration of the belt.

In accordance with the invention a locking detent (11) is provided which can lock with locking teeth (locking wheels 8) of the belt shaft (5). A control part (21) which is freely rotatably supported on the belt shaft serves to operate the locking detent. The control part (21) can be moved to its locking position by a support member (15), which is fixed to the belt shaft (5) and has locking teeth (16), by the action of a sensor pawl lever (34). The latter is supported at the control part and can be directly positioned by means of a vehicle-sensitive inertia sensor (42). And/or a belt-sensitive inertia sensor (38) attached to support member (15) can lock-in with control part (21).

A mutual dependence of the two activating systems is thus avoided by the configuration of the automatic roll-up device according to the invention. In contrast to the mentioned, known device, in the automatic roll-up device according to the invention the vehicle-sensitive and the belt-sensitive activating mechanisms and their parts operate in their effects parallel to each other, i.e. a locking effect is achieved either by the vehicle-sensitive mechanism, or by the belt-sensitive activating mechanism, or by both activating mechanisms together. Each activating mechanism in no way influences the function of the other activating mechanism. The coupling disc according to the mentioned known device is not required. By the alternative or combined direct locking the activating mechanism operates with extremely short locking time. Finally, by the use of the two functionally parallel and separated systems one obtains the advantage that the automatic roll-up device can also be constructed with only one locking system, whereby the parts for the other locking system, vehicle-sensitive or belt-sensitive, can be omitted.

By the functional separation of the two before mentioned locking systems a special advantage is that the locking system can be made to very exact specifications but can be varied in operation by adjustment. For example, by employing a belt-sensitive inertia sensor constructed in the form of a one-armed lever and kept in a rest position by a spring, with several spring attachment means for different preloaded spring forces, the belt sensitivity value may be varied at the belt-sensitive activating mechanism attaching the spring associated with the inertia sensor at a different attachment means, without influencing the function and action of the other activating mechanism in any manner by this change.

Further advantageous details of the invention can be learned from the typical embodiment shown in the drawing and described in the following. In FIG. 1 is shown a U-shaped housing 1 of the device with side plates 2 and 3 and a bearing plate 4 fastened at the outside of the side plate 2. Onto a belt shaft 5 a belt, not shown, can be rolled-up between spool-flanges 6. Follower toothed-discs 7, arranged at the outer surfaces of the spool flanges 6, are in fixed connection with the belt shaft 5. Locking wheels 8 having outer teeth, can be mounted onto the toothed follower wheels 7, and be fastened, for example, by rivets. As shown by FIG. 1 in conjunction with FIG. 3, the distance between the two locking wheels 8 is so chosen that they are positioned in the essentially round recesses 9 in the sideplates 2 and 3 when the belt shaft 5 is assembled in place. A U-shaped locking detent 11 is arranged in wedge-shaped slots 10 which are tangentially oriented at the recesses 9. The detent 11 is on bearing shoulders 12, so that it can swing about a certain angle, which angle is laid out so that the U-shaped detent in the up-position engages with the locking teeth 13 in the outer locking teeth of the locking wheels 8, while in the lower rest position the detent clears the locking wheels 8. The belt shaft 5 is provided at both sides with bearing hubs 14 and 14'. A support member 15 is provided at the side of the side plate 2 for the support of belt shaft at the bearing hubs 14 and 14'. The support member 15 is made in the form of a gear with engagement teeth 16, and has a bearing collar 17 (FIG. 3) and a bearing extension 18. The support member 15 is supported with the last mentioned bearing extension 18 in a bearing opening 19 of the bearing plate 4. The belt shaft 5 with the bearing hub 14 is supported in the inner diameter of the bearing extension 18, as shown in FIG. 3. At the other side, there is also a bearing plate 4' rigidly fastened to the side plate 3, in whose bearing opening 20 the belt shaft 5 with the bearing hub 14' is supported. Although not shown, the bearing hub 14' extends beyond the side plate 4', and is connected with one end of a roll-up spring, which is secured at the other end at a support member which is fixed to the housing. A control part 21 is freely rotatably supported on the bearing collar 17 (FIG. 3) of the support member 15. The control part 21 is provided with a shell-like projection 22 with interior locking teeth 23 disposed concentrically to the belt shaft 5, and is supported with its bearing opening 24 on the bearing collar 17 of the support member 15. The shell-like projection 22 of the control part 21 surrounds a hollow space 25 in which the support member 15 is located. Furthermore, the control part 21 is provided with a first lever-like lobe 26 comprising a control pin 27 at one side, and a bearing support pin 28 at the other side. The second lever-like projection 29 lies diametrically opposite to the first-mentioned lobe 26, and is provided with a pin 30 for a spring 31 which at the other side bears against a projection 32 at the bearing plate 4. The control part 21 with the control pin 27 can hinge a predetermined amount in an opening 33 of the bearing plate 4. The amount of hinged motion is so chosen that at the hinging of the control part 21 against the force of spring 31, the control pin 27 comes in contact with the detent 11, and lifts the latter into the above-mentioned lock-position, in which the detent 11 engages the locking wheels 8. An operating lever 34 in the form of a one-armed lever is hingeably supported on the bearing pin 28 of the control part 21, which extends through a perforation 35 through the shell-like projection 22 of the control part 21, and which can engage by means of a tooth 36 with the locking teeth 16 of the support member 15.

Figure 4:
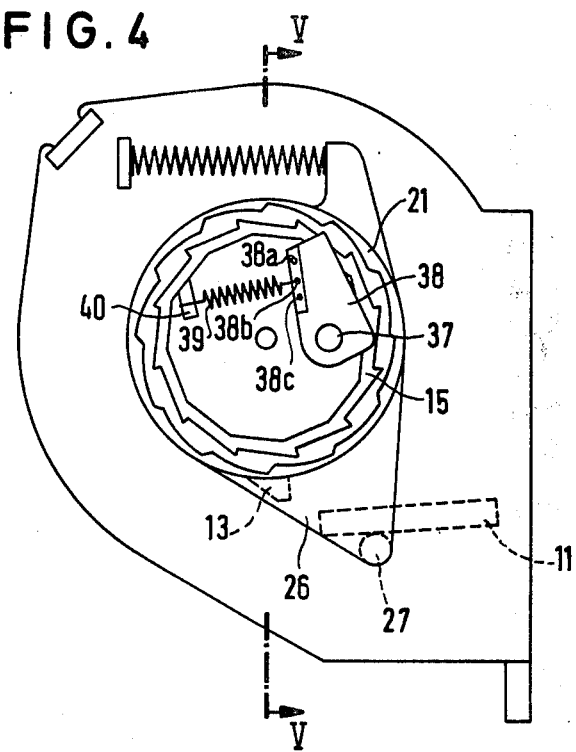
FIGS. 4 and 5 are a side view and a sectional view of the automatic roll-up device according to FIG. 1 for locking responsive to the belt, in which the parts required for vehicle-sensitive locking are omitted.

A belt-sensitive inertia sensor 38 in the form of a one-armed lever is hingeably supported off-center on a support pin 37. The inertia sensor 38 is held in a rest position by being pulled toward the axis of the belt shaft 5 by a tension-spring 39. The spring 39 is provided with a counter-support at a projection 40 located on the support member 15. As shown in FIGS. 1 and 4, several spring attachment holes 38a, 38b and 38c are provided in a recess of the inertial sensor 38 at different distances from the pivot axis, and the spring 39 can be attached into a selected hole. The inertial sensor 38 has an L-shaped cross section, whose outer leg 38' with respect to the support member 15 extends beyond the shell-shaped projection of the control part 15, and leg 38' which serves as a locking tooth can lock with the inner locking teeth 23 of the control part 21. The support part 15 is in fixed connection with the bearing hub 14 of the belt-shaft 5. A dove-tailed support projection 41 is attached to or united with the bearing plate 4 as one piece. Projection 41 serves to support an inertial sensor 42 which is sensitive to the vehicle motion. The inertial sensor 42 consists of a support part 43 connected to a plate 44 which can be inserted and locked in the dove-tailed support projection 41. An inertial ball 45 is retained in a conically expanded recess on the support part 43, in known manner. A sensor-lever 46, hingeably supported at the support part 43, rests freely on the inertial ball.

The vehicle-sensitive locking action of the described automatic roll-up device is described with the aid of FIGS. 2 and 3. Whenever a deceleration or acceleration of the vehicle in which the automatic roll-up device is installed, exceeds a predetermined amount, the inertial ball 45 is displaced from the center of the support part 43, whereby the sensor-lever 46 is lifted upward. The sensor lever 46 makes contact with the sensor lever 34, displaces the latter in the direction toward the belt shaft axis and engages it directly with the locking teeth 16 of the support part 15. The result is that control part 21 and the support member 15 are form-lockingly connected with each other. Since the support member 15 is in a fixed connection with the belt 5, the control part 21 is moved against the force of spring 31 when the belt is pulled from the belt shaft 5, so that the control detent 11 is moved to the lock position by means of the control pin 27, and the locking teeth 13 of detent 11 engage with the locking wheels 8, as indicated by the dashed lines in FIG. 2. Thereby, the belt shaft 5 and the belt are locked. The release of the system is effected by spring 31, which presses the control part 21 again into the rest position, after the inertia ball 45 is again disposed in the rest position.

Figure 5:
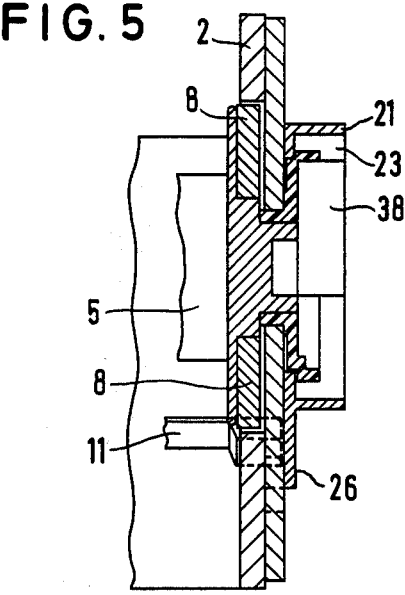

The belt-sensitive locking is explained with the aid of FIGS. 4 and 5. In case of a crash, the person in the vehicle secured by the safety belt falls forward, whereby the belt is pulled out with very high acceleration. An acceleration moment is thereby applied by the rotating belt shaft 5 onto the support member 15 connected to it. This has the effect of displacing the lever-like inertial sensor 38 from its rest position against the force of spring 39 and engaging with the inner locking teeth of the control part 21. As a result, control part 21 performs a swinging motion, and thereby moves the locking detent 11 into the lock position, as explained above. By moving the inertial sensor 38 outward, a form-locking connection is established between the control part 21 and the support member 15, whereby the locking action is set in motion. The resetting of the system to the rest position is effected by the tension spring 39 after the acceleration moment ceases to act.

I claim:

1. Automatic wind-up roller for a safety belt of a vehicle with means to block a belt shaft on which the safety belt is wound in case of danger due to exceeding a predetermined acceleration or deceleration of the vehicle or due to exceeding a predetermined acceleration of belt pullout, comprising a housing, a belt shaft rotatably supported in the housing, a safety belt rolled around the belt shaft, a locking wheel with locking teeth fixed to the belt shaft and rotatable therewith, a locking detent adapted to engage the locking teeth of the locking wheel to block the belt shaft in case of danger but normally out of engagement with the locking teeth, a control part rotatably supported on the belt shaft rotatable from a rest position to a locking position in which the control part moves the locking detent in engagement with the locking teeth of the locking wheel, a support member fixed to the belt shaft for moving the control part to its locking position, said support member having locking teeth, and an operating lever mounted on the control part and movable to engage the locking teeth of the support member, (a) a vehicle-sensitive inertia sensor which activates said operating lever mounted on the control part to move to engage the locking teeth of the support member when a predetermined acceleration or deceleration of the vehicle is exceeded, the support member through said engagement of the operating lever moving the control part to its locking position, (b) a belt-sensitive inertia sensor attached to said support member which sensor engages the control part when the belt pullout exceeds a predetermined acceleration, the support member through said engagement of said sensor moving the control part to its locking position.

2. Automatic roll-up device according to claim 1, wherein the control part has a disc-like shape, and is provided with interior locking teeth which can engage with the belt sensitive inertia sensor.

3. Automatic roll-up device according to claim 1, wherein the belt-sensitive inertia-sensor is constructed in the form of a one-armed lever, and wherein a spring urges said lever inward into its rest position.

4. Automatic roll-up device according to claim 1, wherein the support member is constructed in the form of a toothed wheel with outer locking teeth, and wherein the belt-sensitive inertia sensor is hingeably attached in an off-center position at said support member.

5. Roll-up device according to claim 4, wherein the belt-sensitive inertia sensor is constructed in the form of a one-armed lever and kept in its rest position by a spring and wherein several spring attachment means are provided for different preloaded spring forces.

6. Automatic wind-up roller for a safety belt of a vehicle with means to block a belt shaft on which the safety belt is wound in case of danger due to exceeding a predetermined acceleration of deceleration of the vehicle or due to exceeding a predetermined acceleration of belt pullout, comprising a housing, a belt shaft rotatably supported in the housing, a safety belt rolled around the belt shaft, a locking wheel with locking teeth fixed to the belt shaft and rotatable therewith, a locking detent adapted to engage the locking teeth of the locking wheel to block the belt shaft in case of danger but normally out of engagement with the locking teeth, a control part rotatably supported on the belt shaft rotatable from a rest position to a locking position in which the control part moves the locking detent in engagement with the locking teeth of the locking wheel, a support member fixed to the belt shaft for moving the control part to its locking position, said support member having locking teeth, and an operating lever mounted on the control part and movable to engage the locking teeth of the support member, (a) a vehicle-sensitive inertia sensor which activates said operating lever mounted on the control part to move to engage the locking teeth of the support member when a predetermined acceleration or deceleration of the vehicle is exceeded, and the support member through said engagement of the operating lever moving the control part to its locking position, and (b) a belt-sensitive inertia sensor attached to said support member which sensor engages the control part when the belt pullout exceeds a predetermined acceleration, the support member through said engagement of said sensor moving the control part to its locking position and, wherein the support member is provided with a bearing collar on which the control part is rotatably supported, and wherein the support member is furthermore provided with a bearing-extension for supporting the support member in the housing of the roll-up device and which bearing-extension serves as journal for the belt-shaft.

7. Automatic roll-up device according to claim 6, wherein the control part is provided with a hollow space having interior locking teeth in which hollow space said support member is arranged.

8. Automatic roll-up device according to claim 7, wherein the interior locking teeth are in a shell-like extension of the control part, and wherein a perforation is provided in said extension through which extends a sensor lever which may be activated by the vehicle-sensitive inertia-sensor to engage with the locking teeth of the support member.

9. Automatic roll-up device according to claim 1, wherein the control part is constructed in the form of a lever which can swing into a lock position about a predetermined angle against the force of a return spring, and in this lock position moves the locking detent, rotatably supported at the housing, from the outside to the inside until it engages with the locking teeth of the locking wheel.

* * * * *